(12) United States Patent
Wang et al.

(10) Patent No.: US 12,288,533 B2
(45) Date of Patent: Apr. 29, 2025

(54) DISPLAY PANEL AND BACKLIGHT COMPENSATION METHOD THEREFOR

(71) Applicant: HKC CORPORATION LIMITED, Shenzhen (CN)

(72) Inventors: Hongsong Wang, Shenzhen (CN); Junfeng Xie, Shenzhen (CN)

(73) Assignee: HKC CORPORATION LIMITED, Shenzhen (CN)

( * ) Notice: Subject to any disclaimer, the term of this patent is extended or adjusted under 35 U.S.C. 154(b) by 0 days.

(21) Appl. No.: 18/663,093

(22) Filed: May 14, 2024

(65) Prior Publication Data

US 2024/0404482 A1    Dec. 5, 2024

(30) Foreign Application Priority Data

May 30, 2023   (CN) ......................... 202310626959.5

(51) Int. Cl.
*G09G 3/34* (2006.01)
*G09G 3/32* (2016.01)
*G09G 3/36* (2006.01)

(52) U.S. Cl.
CPC ............. *G09G 3/3426* (2013.01); *G09G 3/32* (2013.01); *G09G 3/36* (2013.01); *G09G 2320/0233* (2013.01); *G09G 2354/00* (2013.01); *G09G 2360/144* (2013.01); *G09G 2360/16* (2013.01)

(58) Field of Classification Search
CPC .... G09G 3/32; G09G 3/36; G09G 2320/0233; G09G 2354/00; G09G 2360/144; G09G 2360/16; G09G 3/3406; G09G 3/3413; G09G 3/342
See application file for complete search history.

(56) References Cited

U.S. PATENT DOCUMENTS

| | | | |
|---|---|---|---|
| 2019/0130852 A1 | 5/2019 | Liao et al. | |
| 2023/0100868 A1* | 3/2023 | Xiao | G09G 3/2007 345/690 |
| 2023/0377502 A1* | 11/2023 | Orio | G02B 27/017 |
| 2024/0212635 A1* | 6/2024 | Li | G09G 3/20 |

FOREIGN PATENT DOCUMENTS

| | | |
|---|---|---|
| CN | 108447430 A | 8/2018 |
| CN | 112102791 A | 12/2020 |
| CN | 115857230 A | 3/2023 |

* cited by examiner

*Primary Examiner* — Dennis P Joseph

(57) ABSTRACT

A display panel and a backlight compensation method therefor are disclosed. The backlight compensation method includes: detecting ambient light parameters at four positions of the display panel to obtain an ambient light intensity parameters at a first position, a second position, a third position, and a fourth position; obtaining a partition compensation table for a total number of n*m partitions based on the ambient light intensity parameters at the first and second positions, the second position, the first preset parameter, the partition parameter in the first direction, the ambient light intensity parameter at the third and fourth positions, the second preset parameter, and the partition parameter in the second direction; and driving respective backlight sources of different partitions according to the partition compensation table; where each partition includes at least one lamp bead.

19 Claims, 10 Drawing Sheets

| |
|---|
| $b_1$ |
| $b_1 q_2$ |
| $b_1 q_2^2$ |
| ⋮ |
| ⋮ |
| ⋮ |
| $b_1 q_2^{m-1}$ |
| $b_1 q_2^m$ |

FIG. 3

| | | | | | | |
|---|---|---|---|---|---|---|
| $a_1+b_1$ | $a_2+b_1$ | $a_3+b_1$ | ... | ... | ... | $a_{n-1}+b_1$ | $a_n+b_1$ |
| $a_1+b_2$ | $a_2+b_2$ | $a_3+b_2$ | ... | ... | ... | $a_{n-1}+b_2$ | $a_n+b_2$ |
| $a_1+b_3$ | $a_2+b_3$ | $a_3+b_3$ | ... | ... | ... | $a_{n-1}+b_3$ | $a_n+b_3$ |
| ... | ... | ... | ... | ... | ... | ... | ... |
| ... | ... | ... | ... | ... | ... | ... | ... |
| ... | ... | ... | ... | ... | ... | ... | ... |
| $a_1+b_{m-1}$ | $a_2+b_{m-1}$ | $a_3+b_{m-1}$ | ... | ... | ... | $a_{n-1}+b_{m-1}$ | $a_n+b_{m-1}$ |
| $a_1+b_m$ | $a_2+b_m$ | $a_3+b_m$ | ... | ... | ... | $a_{n-1}+b_m$ | $a_n+b_m$ |

FIG. 4

```
┌─────────────────────────────────────────────────────────────────┐
│ Detecting ambient light parameters at four positions of a       │
│ display panel to obtain an ambient light intensity parameter    │── S100
│ at a first position, an ambient light intensity parameter at a  │
│ second position, an ambient light intensity parameter at a third│
│ position, and an ambient light intensity parameter at a fourth  │
│ position                                                        │
└─────────────────────────────────────────────────────────────────┘
                                │
                                ▼
┌─────────────────────────────────────────────────────────────────┐
│ Calculating a ratio of the ambient light intensity parameter at │
│ the first position to the ambient light intensity parameter at  │
│ the second position, and adjusting a first preset parameter and │── S200
│ a partition parameter in a first direction based on the ratio of│
│ the ambient light intensity parameter at the first position to  │
│ the ambient light intensity parameter at the second position    │
└─────────────────────────────────────────────────────────────────┘
                                │
                                ▼
┌─────────────────────────────────────────────────────────────────┐
│ Calculating a ratio of the ambient light intensity parameter at │
│ the third position to the ambient light intensity parameter at  │
│ the fourth position, and adjusting a second preset parameter and│── S300
│ a partition parameter in a second direction based on the ratio  │
│ of the ambient light intensity parameter at the third position  │
│ to the ambient light intensity parameter at the fourth position │
└─────────────────────────────────────────────────────────────────┘
                                │
                                ▼
┌─────────────────────────────────────────────────────────────────┐
│ Obtaining a partition compensation table for a total number of  │
│ n*m partitions based on the ambient light intensity parameter at│
│ the first direction, the ambient light intensity parameter at   │
│ the second position, the first preset parameter, the partition  │── S400
│ parameter and the first direction, the ambient light intensity  │
│ parameter at the third position, the ambient light intensity    │
│ parameter and the fourth position, the second preset parameter, │
│ and the partition parameter in the second direction             │
└─────────────────────────────────────────────────────────────────┘
                                │
                                ▼
┌─────────────────────────────────────────────────────────────────┐
│ Generating a standard compensation table based on a standard    │── S511
│ first preset parameter, a standard second preset parameter, and │
│ the total number of partitions                                  │
└─────────────────────────────────────────────────────────────────┘
                                │
                                ▼
┌─────────────────────────────────────────────────────────────────┐
│ Fixing a current magnification factor of each partition         │
│ according to the standard compensation table to form a          │── S512
│ respective backlight circuit compensated according to the       │
│ standard compensation table                                     │
└─────────────────────────────────────────────────────────────────┘
                                │
                                ▼
┌─────────────────────────────────────────────────────────────────┐
│ Outputting an initialization current to the backlight circuit   │
│ according to the ambient light intensity parameter at the first │── S513
│ position or the ambient light intensity parameter at the second │
│ location, and a correction coefficient                          │
└─────────────────────────────────────────────────────────────────┘
```

FIG. 7

| 1 | $q_1$ | $q_1^2$ | ... | ... | ... | $q_1^{n-1}$ | $q_1^n$ |
|---|---|---|---|---|---|---|---|
| $q_2$ | $q_1+q_2$ | $q_1^2+q_2$ | ... | ... | ... | $q_1^{n-1}+q_2$ | $q_1^n+q_2$ |
| $q_2^2$ | $q_1+q_2^2$ | $q_1^2+q_2^2$ | ... | ... | ... | $q_1^{n-1}+q_2^2$ | $q_1^{n-1}+q_2^2$ |
| ... | ... | ... | ... | ... | ... | ... | ... |
| ... | ... | ... | ... | ... | ... | ... | ... |
| ... | ... | ... | ... | ... | ... | ... | ... |
| $q_2^{m-1}$ | $q_1^1+q_2^{m-1}$ | $q_1^2+q_2^{m-1}$ | ... | ... | ... | $q_1^{n-1}+q_2^{m-1}$ | $q_1^n+q_2^{m-1}$ |
| $q_2^m$ | $q_1^1+q_2^m$ | $q_1^2+q_2^m$ | ... | ... | ... | $q_1^{n-1}+q_2^m$ | $q_1^n+q_2^m$ |

FIG. 8

DISPLAY PANEL AND BACKLIGHT COMPENSATION METHOD THEREFOR

CROSS-REFERENCE TO RELATED APPLICATIONS

This application claims the priority and benefit of Chinese patent application number 202310626959.5, titled "Display Panel and Backlight Compensation Method Therefor" and filed May 30, 2023 with China National Intellectual Property Administration, the entire contents of which are incorporated herein by reference.

TECHNICAL FIELD

This application relates to the field of display technology, and more particularly relates to a display panel and a backlight compensation method therefor.

BACKGROUND

The description provided in this section is intended for the mere purpose of providing background information related to this application but doesn't necessarily constitute prior art.

A liquid crystal display (LCD) device includes an LCD panel that displays images and a panel driving circuit that drives the LCD panel. An LCD panel generally includes an array substrate on which switching elements, scan lines for transmitting gate voltage signals to the switching elements, and data lines for transmitting data voltage signals to the switching elements are disposed. The LCD panel requires a backlight module to realize the display effect. The backlight module is a device that is arranged behind the LCD panel and that provides a light source for the LCD panel. Its light-emitting effect and performance parameters directly influence the visual effect of the LCD panel. With the gradual development of LED, mini LED backlight products are emerging. The application characteristics of min LED are mainly reflected in the size and the modular structure, that is, "mini" miniaturized light source. Its small size allows the spacing of the backlight module to be denser, thereby reducing the light mixing distance (also called optical distance) and the module thickness.

For vehicle-mounted display panels or other display panels used outdoors, because of the different angles of incidence of the ambient light and the different effects of different types of ambient light on the display panel, the display effect is not satisfactory. In this regard, those having ordinary skill in the art are in urgent need of a solution.

SUMMARY

In view of the above, it is an objective of this application to provide a display panel and a backlight compensation method therefor to improve the display effect of the display panel under strong light incident at different angles.

This application discloses a backlight compensation method for a display panel. The display panel includes a backlight, which provides a light source for the display panel. The backlight compensation method includes:

detecting the ambient light parameters at four positions of the display panel to obtain an ambient light intensity parameter at a first position, an ambient light intensity parameter at a second position, an ambient light intensity parameters at a third position, and an ambient light intensity parameter at a fourth position;

calculating a ratio of the ambient light intensity parameter at the first position and the ambient light intensity parameter at the second position, and adjusting a first preset parameter and a partition parameter in a first direction based on the ratio of the ambient light intensity parameter at the first position to the ambient light intensity parameter at the second position and the preset model;

calculating a ratio of the ambient light intensity parameter at the third position to the ambient light intensity parameter at the fourth position, and adjusting a second preset parameter and a partition parameter in a second direction based on the ratio of the ambient light intensity parameter at the third position to the ambient light intensity parameter at the fourth position and the preset model;

obtaining a partition compensation table for a total number of $n*m$ partitions based on the ambient light intensity parameter at the first position, the ambient light intensity parameter at the second position, the first preset parameter, the partition parameter in the first direction, the ambient light intensity parameter at the third position, the ambient light intensity parameter at the fourth position, the second preset parameter, and the partition parameter in the second direction;

driving backlight sources of a plurality of different partitions according to the partition compensation table;

where the four positions are respectively four sides of a light emitting surface of the display panel, where the first position and the second position are opposite sides, and the third position and the fourth position are opposite sides, where a direction pointing from the first position to the second position is the first direction, and the direction pointing from the third position to the fourth position is the second direction, wherein a number of partitions arranged in the first direction is n, a number of partitions arranged in the second direction is m, and a total number of partitions is $n*m$; the first preset parameter is a ratio of the ambient light intensity parameters between adjacent partitions in the first direction, and the second preset parameter is a ratio of the ambient light intensity parameters between adjacent partitions in the second direction; each of the plurality of partitions includes at least one lamp bead, and m and n are natural numbers greater than 0.

In some embodiments, the first preset parameter is less than or equal to 1.007 and greater than or equal to 0.993, and the second preset parameter is less than or equal to 1.007 and greater than or equal to 0.993.

In some embodiments, prior to the operations of calculating the ratio of the ambient light intensity parameter at the first position to the ambient light intensity parameter at the second position, and adjusting the first preset parameter and the partition parameter in the first direction based on the ratio of the ambient light intensity parameter at the first position to the ambient light intensity parameter at the second position and the preset model, the backlight compensation method further includes:

identifying whether the ambient light intensity parameter at the first position and the ambient light intensity parameter at the second position meet a preset condition;

if they meet the preset condition, performing the operations of calculating the ratio of the ambient light intensity parameter at the first position to the ambient light intensity parameter at the second position, and adjusting the first preset parameter and the partition parameter in the first direction based on the ratio of the ambient light intensity parameter at the first position to the ambient light intensity parameter at the second position and the preset model; and if they don't meet the preset condition, directly driving the backlight using a first driving value.

In some embodiments, prior to the operations of calculating the ratio of the ambient light intensity parameter at the third position to the ambient light intensity parameter at the fourth position, and adjusting the second preset parameter and the partition parameter in the second direction based on the ratio of the ambient light intensity parameter at the third position to the ambient light intensity parameter at the fourth position and the preset model, the backlight compensation method further includes:

identifying whether the ambient light intensity parameter at the third position and the ambient light intensity parameter at the fourth position meet the preset condition;

if they meet the preset condition, then performing the operations of calculating the ratio of the ambient light intensity parameter at the third position to the ambient light intensity parameter at the fourth position, and adjusting the second preset parameter and the partition parameter in the second direction based on the ratio of the ambient light intensity parameter at the third position to the ambient light intensity parameter at the fourth position and the preset model;

if they don't meet the preset condition, directly driving the backlight with the first driving value.

In some embodiments, from the first position to the second position, there are set n partition parameters, and the preset condition includes:

the ratio of the ambient light intensity parameter at the first position multiplied by the first preset parameter to the power of (n−1) to the ambient light intensity parameter at the second position is less than or equal to 1.2 and greater than or equal to 0.8;

where one lamp bead is disposed in each of the plurality of partitions, and the first preset parameter is equal to 1.007 or 0.993; the first driving value is the larger one of the ambient light intensity parameter at the first position or the ambient light intensity parameter at the second position.

In some embodiments, there are arranged n partitions from the first position to the second position, and the preset model is that the ratio of the ambient light intensity parameter at the first position to the ambient light intensity parameter at the second position is equal to the first preset parameter to the power of (n−1). There are arranged m partitions from the third position to the fourth position, and the preset model is that the ratio of the ambient light intensity parameter at the third position to the ambient light intensity parameter at the fourth position is equal to the second preset parameter to the power of (m−1).

In the partition compensation table, the ambient light intensity parameter $L(x, y)$ of the $(x, y)$th partition satisfies $L(x, y)=a1*q1^{(x-1)}+b1*q2^{(y-1)}$, $1 \leq x \leq n$, $1 \leq y \leq m$, wherein $a1$ is the ambient light intensity parameter at the first position, $q1$ is the first preset parameter, $b1$ is the ambient light intensity parameter at the third position, $q2$ is the second preset parameter, and $x$ and $y$ are natural numbers greater than 0.

In some embodiments, the operation of driving the backlight sources of a plurality of different partitions according to the partition compensation table includes:

controlling a current of a backlight circuit of each partition to be output to the at least one lamp bead of this partition to emit light according to the partition compensation table.

In some embodiments, the operation of driving the backlight sources of a plurality of different partitions according to the partition compensation table includes:

generating a standard compensation table based on a standard first preset parameter, a standard second preset parameter, and the total number of partitions;

fixing the current amplification factor of each partition based on the standard compensation table to form a backlight circuit compensated based on the standard compensation table;

outputting an initialization current to the backlight circuit based on the ambient light intensity parameter at the first position or the ambient light intensity parameter at the second position, and a correction coefficient;

where the correction coefficient is obtained based on the standard compensation table and the partition compensation table, and the number of partitions is n*m.

This application further discloses a display panel, which includes a display substrate, a backlight arranged under the display substrate, ambient light sensors respectively arranged on four sides of a light-emitting surface of the display substrate, and a drive control module. There are four ambient light sensors, which are respectively disposed on the four sides of the light-emitting surface of the display substrate. The ambient light sensors are used to detect the ambient light parameters of the display panel, to obtain an ambient light intensity parameter at a first position, an ambient light intensity parameter at a second position, an ambient light intensity parameter at a third position, and an ambient light intensity parameter at a fourth position. The four positions are respectively the four sides of the light emitting surface of the display panel. The third position and the fourth position are opposite sides. The direction pointing from the first position to the second position is the first direction, and the direction pointing from the third position to the fourth position is the second direction. The drive control module calculates a ratio of the ambient light intensity parameter at the first position to the ambient light intensity parameter at the second position, and adjusts a first preset parameter and a partition parameter in the first direction based on the ratio of the ambient light intensity parameter at the first position to the ambient light intensity parameter at the second position and a preset model. The drive control module further calculates a ratio of the ambient light intensity parameter at the third position to the ambient light intensity parameter at the fourth position, and adjusts a second preset parameter and a partition parameter in the second direction based on the ratio of the ambient light intensity parameter at the third position to the ambient light intensity parameter at the fourth position and the preset model, wherein a number of partitions arranged in the first direction is n, a number of partitions arranged in the second direction is m, and m and n are natural numbers greater than 0; the drive control module controls the backlight source to drive the backlights of different partitions according to the partition compensation table.

In some embodiments, in the partition compensation table, the ambient light intensity parameter $L(x, y)$ of the $(x, y)$-th partition satisfies $L(x, y)=a1*q1^{(x-1)}+b1*q2^{(y-1)}$, $1 \leq x \leq n$, $1 \leq y \leq m$, where $a1$ is the ambient light intensity parameter at the first position, $q1$ is the first preset parameter, $b1$ is the ambient light intensity parameter at the third position, q2 is the second preset parameter, x and y are natural numbers greater than 0.

In this application, a partition compensation table is obtained by detecting the ambient light on a light-emitting surface of the display panel, and determining the number of partitions in the first direction and the first preset parameter and further determining the number of partitions in the second direction and the second preset parameter based on the ambient light intensity parameters detected at two positions. Finally, the backlight parameter of each partition is adjusted according to the partition compensation table so that the brightnesses of different partitions are different to approach the ambient light intensity distribution of the various partitions recorded in the partition compensation table. In this application, by adjusting the light intensities of the backlight according to the distribution of ambient light, even if the intensity of the ambient light is different at each position, each position can be displayed very clearly thus improving the viewing effect. Another advantage provided by this application is that by setting ambient light sensors at four positions, it is possible to totally cover the situations where sunlight is incident from different directions and the light intensity varies along the direction of incidence. By calculating the ambient light distribution of the entire display panel, real-time compensation can be achieved. Relatively speaking, the cost is low, the compensation effect is significant, and the display panel has a satisfactory display effect under strong light.

BRIEF DESCRIPTION OF DRAWINGS

The accompanying drawings are intended to provide a better understanding of the embodiments according to this application, and they constitute a part of the specification. They are used to illustrate the embodiments according to this application and explain the principle of this application in conjunction with the text description. Apparently, the drawings set forth in the following description merely represent some embodiments of this application, and for those having ordinary skill in the art, other drawings may also be obtained based on these drawings without investing creative efforts. A brief description of the accompanying drawings is provided as follows.

FIG. 3 is a schematic diagram of partitions in a second direction according to the first embodiment of the present application.

FIG. 4 is a schematic diagram of a partition compensation table according to the present application.

FIG. 7 is a flowchart of a backlight compensation method according to a fourth embodiment of the present application.

FIG. 8 is a schematic diagram of a partition compensation table according to the fourth embodiment of the present application.

Figure 1:
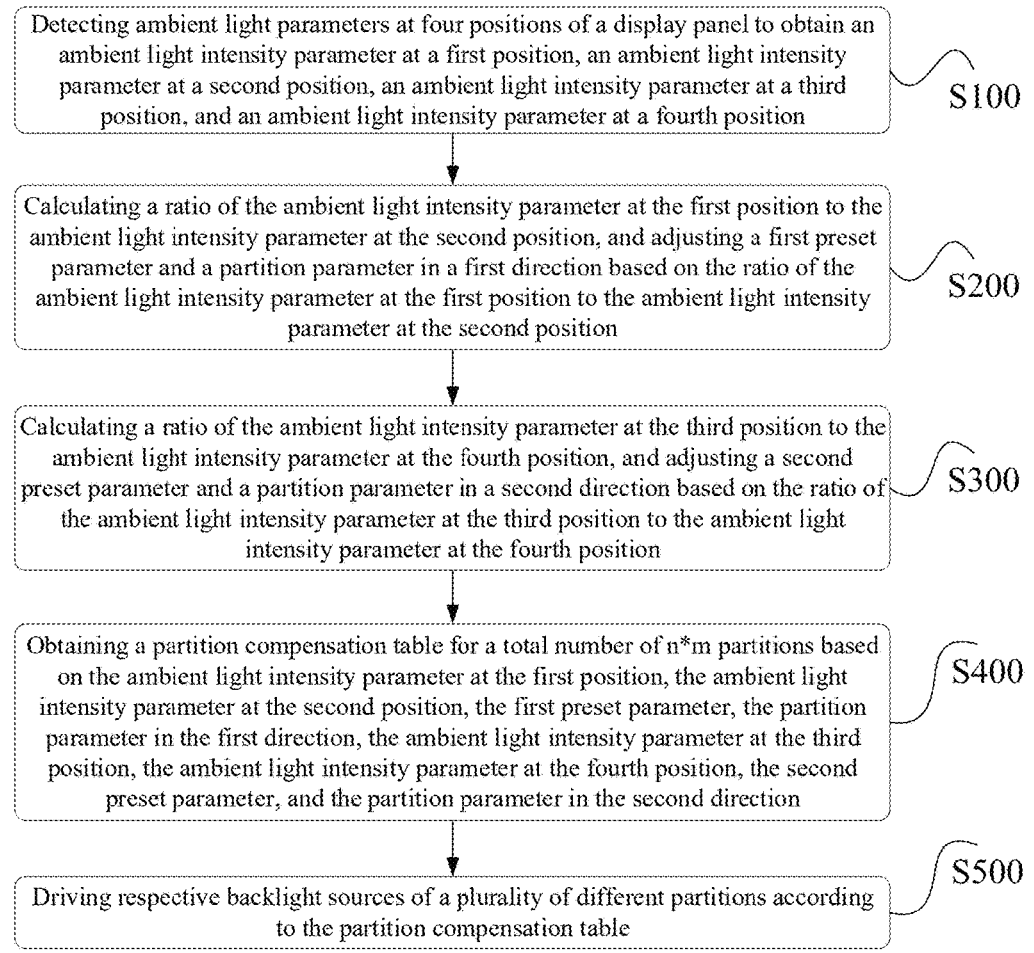
FIG. 1 is a flowchart of a backlight compensation method for a display panel according to a first embodiment of the present application.

In the drawings: 100. Display panel; 101. Display substrate; 102. Light sensor; 103. Amplification unit; AA. Display area; A. First position; B. Second position; C. Third position; D. Fourth position; 200. Display device.

DETAILED DESCRIPTION OF EMBODIMENTS

It should be understood that the terms used herein, the specific structures and function details disclosed herein are intended for the mere purposes of describing specific embodiments and are representative. However, this application may be implemented in many alternative forms and should not be construed as being limited to the embodiments set forth herein.

As used herein, terms "first", "second", or the like are merely used for illustrative purposes, and shall not be construed as indicating relative importance or implicitly indicating the number of technical features specified. Thus, unless otherwise specified, the features defined by "first" and "second" may explicitly or implicitly include one or more of such features. Terms "multiple", "a plurality of", and the like mean two or more. In addition, terms "up", "down", "left", "right", "vertical", and "horizontal", or the like are used to indicate orientational or relative positional relationships based on those illustrated in the drawings. They are merely intended for simplifying the description of the present disclosure, rather than indicating or implying that the device or element referred to must have a particular orientation or be constructed and operate in a particular orientation. Therefore, these terms are not to be construed as restricting the present disclosure. For those of ordinary skill in the art, the specific meanings of the above terms as used in the present application can be understood depending on specific contexts.

Hereinafter this application will be described in further detail with reference to the accompanying drawings and some optional embodiments.

FIG. 1 is a flowchart of a backlight compensation method for a display panel according to a first embodiment of the present application. Referring to FIG. 1, the present application discloses a backlight compensation method for a display panel. The backlight compensation method includes the following steps.

S100: detecting the ambient light parameters at four positions of the display panel, thus obtaining an ambient light intensity parameter at a first position, an ambient light intensity parameter at a second position, an ambient light intensity parameter at a third position, and an ambient light intensity parameter at a fourth position.

The four positions are respectively the four sides of the light emitting surface of the display panel. The first position and the second position are opposite sides, and the third position and the fourth position are opposite sides. The direction pointing from the first position to the second position is the first direction, and the direction pointing from the third position to the fourth position is the second direction.

It is appreciated that in this application, an ambient light sensor is disposed in the non-display area of the display panel to detect the ambient light intensity at that position. For example, if the ambient light is sunlight, the sunlight may be regarded as uniform and parallel light rays. However, when sunlight strikes the light-emitting surface of the display panel at different angles, it has different effects on the display panel. For example, when sunlight strikes the light-emitting surface of the display panel vertically, the ambient light intensity parameters at the first position and at the second position are nearly consistent or completely consistent. For example, when sunlight strikes the light-emitting surface of the display panel at a certain oblique angle, the ambient light intensity parameters at the first position and the second position are greatly different, which in turn causes visual differences in the display brightness at various positions of the display panel. Furthermore, due to different angles of incidence of the sunlight, the sunlight may be incident from the four sides of the display panel. In particular, when the sunlight is incident from the diagonal side, there is not only a variation along the first direction pointing from the first position to the second position, there is also a variation along the second direction pointing from the third position to the fourth position. In this embodiment, compared with the solution of only setting two positions, by detecting the ambient light intensity at four positions, the light variations in the first direction and the second direction can be totally detected.

S200: calculating the ratio of the ambient light intensity parameter at the first position to the ambient light intensity parameter at the second position, and adjusting the first preset parameter and the partition parameter based on the ratio of the ambient light intensity parameter at the first position and the ambient light intensity parameter at the second position and the preset model.

In the scene of oblique sunlight, the light intensity variation from the first position to the second position should be a curve variation of a certain radian. In this embodiment, the preset model is obtained by analyzing the curve relationship of light intensity variations from the first position to the second position. The preset model is mainly about the relationship between the first preset parameter, the partition parameter, and the ratio of the ambient light intensity parameter at the first position to the ambient light intensity parameter at the second position. The first preset parameter is the ratio of ambient light intensity parameters between adjacent partitions. The partition parameter is the number of partitions. The partitions are mainly multiple partitions with equal areas arranged from the first position to the second position.

S300: calculating the ratio of the ambient light intensity parameter at the third position to the ambient light intensity parameter at the fourth position, and adjusting the second preset parameter and the partition parameter in the second direction based on the ratio of the ambient light intensity parameter at the third position to the ambient light intensity parameter at the fourth position and the preset model.

Analogous to the way the light intensity variations from the first position to the second position, the ambient light intensity also varies from the third position to the fourth position. By detecting the ambient light intensity parameter at the third position and the ambient light intensity parameter at the fourth position, values such as the partition parameter and the second preset parameter in the second direction may be obtained.

The first position and the second position are arranged symmetrically along the central axis in the first direction, and the third position and the fourth position are arranged symmetrically along the central axis in the second direction. In a special case, for example, the first position and the second position may be respectively disposed at adjacent corners of the light-emitting surface of the display panel, and the third position and the fourth position may also be respectively disposed at adjacent corners of the light-emitting surface of the display panel. The first position and the third position may coincide with each other. In this case, only the ambient light intensity parameters at three positions need to be detected, and then the ambient light covering the light-emitting surface of the display panel may be detected. In another special case, on the basis of the above, a fourth ambient light sensor may also be arranged at a diagonal position of the first position to perform parameter correction or verification.

It can be appreciated that the steps of S200 and S300 may be performed concurrently.

S400: obtaining a partition compensation table for n*m partitions based on the ambient light intensity parameter at the first position, the ambient light intensity parameter at the second position, the first preset parameter, the partition parameter in the first direction, the ambient light intensity parameter at the third position, the ambient light intensity parameter at the fourth position, the second preset parameter and the partition parameter in the second direction.

The number of partitions in the first direction is n, the number of partitions in the second direction is m, and the number of partitions is n*m. The first preset parameter is the ratio of the ambient light intensity parameters between adjacent partitions in the first direction, and the second preset parameter is the ratio of the ambient light intensity parameters between adjacent partitions in the second direction. Each of the partitions includes at least one lamp bead. The partition compensation table mainly records the ambient light intensity parameter of each partition. Since the ambient light intensity parameters of the various partitions are different, driven by the backlight of the same intensity, the display clarity of different partitions is also different, causing the problem that some display images cannot be seen clearly.

S500: driving the backlight sources of different partitions according to the partition compensation table.

In this embodiment, mainly based on the ambient light intensity parameters of different partitions, the brightness is adjusted according to the ambient light of different partitions by adjusting the current or other parameters of the backlight of each partition.

In this application, the partition compensation table is obtained by detecting the ambient light on the light-emitting surface of the display panel, and determining the number of partitions in the first direction and the first preset parameter and further determining the number of partitions in the second direction and the second preset parameter based on the ambient light intensity parameters detected at two positions. Finally, the backlight parameter of each partition is adjusted according to the partition compensation table so that the brightnesses of different partitions are different to approach the ambient light intensity distribution of various partitions in the partition compensation table. In the present application, the light intensities of the backlight sources are adjusted according to the distribution of the ambient light, so that even though the ambient light intensity is different at each position, each position can be displayed very clearly thus improving the viewing effect. Another advantage of the present application is that by setting ambient light sensors at four positions, it is possible to totally cover the situation where sunlight is incident from different directions and the light intensity variations along the direction of incidence. By calculating the ambient light distribution of the entire display panel, real-time compensation can be achieved. Relatively speaking, the cost is low, the compensation effect is significant, and the display panel has a satisfactory display effect under strong light.

At least one LED lamp bead is installed in each partition. That is, the minimum size of each partition on the screen cannot be smaller than the size of an individual LED. If it is smaller than the size of the LED, then two or more LEDs are required to be adjusted corresponding to one same partition, or one LED may be required to be adjusted corresponding to multiple partitions. On the one hand, there may be quality issues due to the intersection of light rays from the two lights, and on the other hand, the control algorithm may be more complex.

In particular, the first preset parameter may be less than or equal to 1.007 and greater than or equal to 0.993, and the second preset parameter may be less than or equal to 1.007 and greater than or equal to 0.993.

Figure 2:
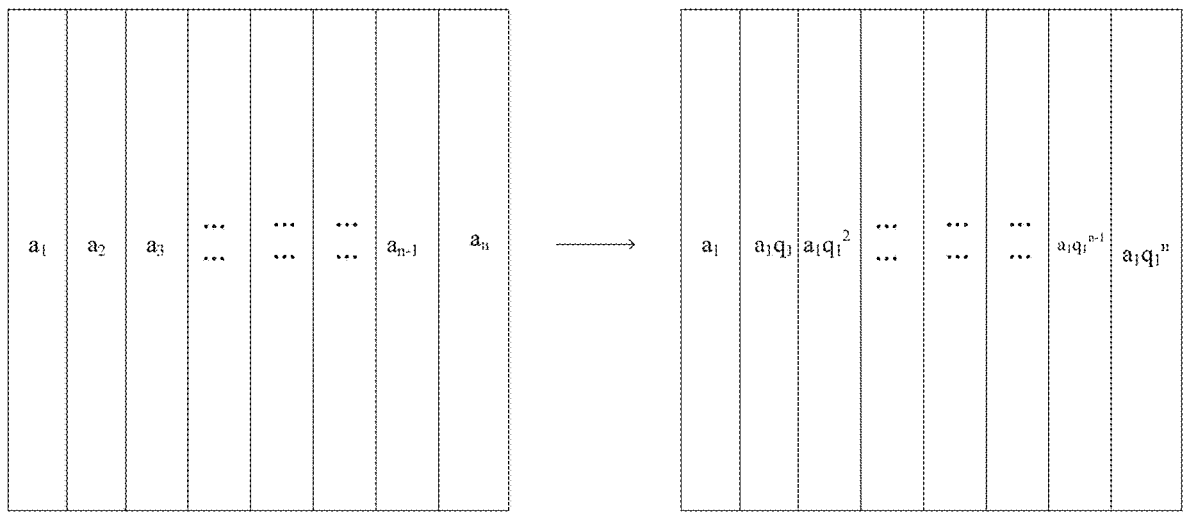
FIG. 2 is a schematic diagram of partitions in a first direction according to the first embodiment of the present application.

FIG. 2 is a schematic diagram of partitions in a first direction according to the first embodiment of the present application. Referring to FIG. 2, this application defines the first preset parameter as the ratio of the ambient light intensity parameters of adjacent partitions. For example, let one of the adjacent partitions be a1 and the other adjacent partition be a2, then the brightness difference between the adjacent partitions is (a1−a2)/a1. When a1 is greater than a2 and a2/a1 is equal to 0.993, the brightness difference between adjacent partitions can be calculated to be 0.7%. That is, the brightness difference between adjacent partitions need be less than or equal to 0.7%, such that the human eye cannot perceive the brightness difference between adjacent partitions. In this embodiment, even if each partition is adjusted so that different partitions have different brightnesses, the brightness difference between adjacent partitions cannot be too large. If the difference is too large, the human eyes can clearly distinguish it, resulting in a significant difference in the display image, causing a decrease in display quality. Therefore, in this embodiment, the human eye will not identify the brightness difference in two adjacent partitions on the screen, thereby avoiding poor visual effects and eye fatigue.

Similarly, in the second direction from the third position to the fourth position, it can be seen that the brightness difference between adjacent partitions must be within 0.7% to prevent the human eye from being able to identify the adjacent brightness difference.

In particular, from the first position to the second position, there are set a number of n partition parameters, and the preset model is: the ratio of the ambient light intensity parameter at the first position to the ambient light intensity parameter at the second position is equal to the first preset parameter to the power of (n−1); that is, $q1^{(n-1)}=d/c$. In the above formula, c is the ambient light intensity parameter of the first lo-cation, and d is the ambient light intensity parameter at the second position.

Only looking at the partitions from the first position to the second position, the ambient light intensity parameters of different partitions may be calculated based on the ambient light intensity parameter at the first position c=a1. For example, the ambient light intensity parameter L(x) of the xth partition would be $L(x)=a1*q1^{(x-1)}$, $1 \leq x \leq n$, where a1 is the ambient light intensity parameter at the first position, q1 is the first preset parameter, x and n are natural numbers greater than 0. The ambient light intensity parameter at the second position $d=L(n)=an=a1*q1^{(n-1)}$ can be calculated through a1 based on the q1 and n of the partitions.

In this embodiment, the preset model is a geometric function model, that is, $q1^{(n-1)}=d/c$. The n value can be determined based on different q1 values, or q1 can be determined based on different n values. The more partitions, the more detailed it is, and the cost of achieving partition control would be higher, but the picture adjustment is more detailed. The fewer partitions, the lower the cost of partition control, but the picture is relatively less detailed; nevertheless, overall the brightness also varies with the distribution of ambient light intensity.

For this application, the geometric function model is obtained by calculating the intensity distribution of sunlight irradiating the display panel at different angles, which can be approximately regarded as a geometric function. When sunlight hits the display surface at a vertical angle, compensation for the vertical light can be achieved by setting q1=1.

FIG. 3 is a schematic diagram of partitions in a second direction according to the first embodiment of the present application. Referring to FIG. 3, from the third position to the fourth position, there are set a number of m partition parameters, and the preset model is: the ratio of the ambient light intensity parameter at the third position to the ambient light intensity parameter at the fourth position is equal to the second preset parameter to the power of (m−1) power of; that is, $q2^{(m-1)}=f/e$. In the above formula, e is the ambient light intensity parameter at the first position, and f is the ambient light intensity parameter at the second position.

Only looking at the partitions from the third position to the fourth position, the ambient light intensity parameters of different partitions are calculated with reference to the ambient light intensity parameter at the third position of e=b1. For example, the ambient light intensity parameter of the yth partition $L(y)=b1*q2^{(y-1)}$, $1 \leq y \leq m$, where b1 is the ambient light intensity parameter at the third position, and q2 is the first preset parameter, y and m are natural numbers greater than 0. The ambient light intensity parameter $c=L(n)=bm=b1*q2^{(m-1)}$ at the fourth position can be calculated based on partition q2 and m through b1.

FIG. 4 is a schematic diagram of a partition compensation table according to this application. Referring to FIG. 4, after superimposing the partitions in FIGS. 2 and 3, in the partition compensation table, the ambient light intensity parameter L (x, y) of the (x, y)th partition in the partition compensation table is $L(x, y)=a1*q1^{(x-1)}+b1*q2^{(y-1)}$, $1 \leq x \leq n$, $1 \leq y \leq m$, where a1 is the ambient light intensity parameter at the first position, q1 is the first preset parameter, b1 is the ambient light intensity parameter at the third position, q2 is the second preset parameter, and x, y, m and n are natural numbers greater than 0.

In this partition compensation table, each partition is equal in size, and the display area of the display panel is divided into a number of n*m partitions.

In the specific partitioning scheme, one lamp bead is used as a minimum partition unit. For example, if the same display panel has 100 lamp beads, then it has 100 minimum partition units. If it is divided into 50 partitions, then each partition in the 50 partitions includes two minimum partition units. If it is divided into 100 partitions, then each partition in the 100 partitions includes one minimum partition unit. If it is divided into 25 partitions, then each partition in the 25 partitions is provided with four minimum partition units. It can be understood that the smallest partition unit is the smallest controllable unit, that is, each lamp bead can be controlled and driven individually and independently. If a group of four lamp beads can be controlled individually and independently, then the four lamp beads constitute a minimum partition unit.

For example, in this case, two minimum partition units may be used as one partition, and the brightness ratio between adjacent partitions is 1.007 or 0.993. When the brightness gradually increases from left to right, it is calculated using 1.007. For example, a1=300 nit, then a2=302.1 nit.

For example, taking one minimum partition unit as one partition, then when the brightness gradually increases from left to right, it is calculated using 1.0035. For example, a1=300 nit, a2=300*1.0035=301.5 nit, a3=300*1.0035*1.0035=302.1 nit., an=300*1.0035 ^(n−1).

It can be seen from the above two examples that in the first example, two minimum partition units are used as one partition. At this time, the number of partitions is half of the second example, but the picture fineness also decreases. For situations where the brightness difference between the first position and the second position is relatively small, the effect of improving display fineness or saving power consumption can be achieved by selecting a control solution with more partitions or few partitions respectively.

In particular, the selection can be made based on the actual situation. But the endpoint values of q1 as 1.007 or 0.993 and q2 as 1.007 or 0.993 may be first determined before determining the partitions. In this case, the minimum-partitioning scheme can be deter-mined. In the above, q1 and q2 may be equal or different.

In another solution, the partitions can first be designed according to the size of the display panel. After the partitions are designed, the specific q1 and q2 values can be selected based on the ambient light intensity parameter at the first position and the ambient light intensity parameter at the second position.

Take an example for illustration. For example, the size of the display area of the display panel may be 14 inches, and the length and width of the backlight may be 302*190 mm. When using MINI-LEDs with a spacing of 200 microns, then a maximum of 302/0.2=1510 lamp beads can be placed horizontally and 190/0.2=950 lamp beads vertically. Then the backlight is equipped with a total of 1510*950=1434500 lamp beads. Taking 1,434,500 beads as an example, the partitions from the first position A to the second position B and from the third position C to the fourth position D are 1510*950. Horizontal N=1510, vertical N=950. Assume that the sensor measures a1=300 nit, an=330 nit, then it may be calculated q1=1.0000632. Further assume b1=360 nit, bn=300 nit, then it may be calculated q2=0.99981. In practice, the maximum partition is used to calculate the values of q1 and q2.

It can be understood that the solutions of this application are mainly suitable for vehicle-mounted displays and out-door displays. These displays are mainly used outdoors, and their strong light effects mainly come from sunlight, while other light rays have relatively weak interference with sunlight due to their relatively low intensity. Therefore, the ambient light can be directly regarded as parallel and uniform light, and there is very little influence of disorderly light.

Figure 5:
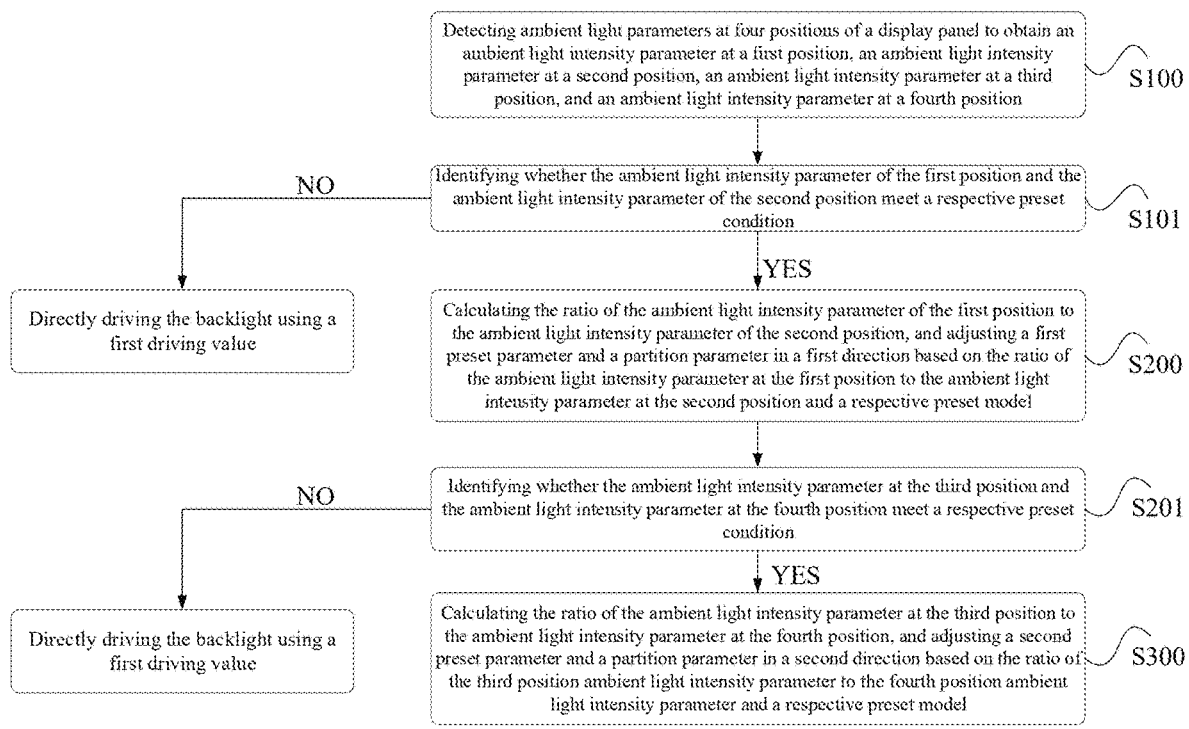
FIG. 5 is a flowchart of a backlight compensation method according to a second embodiment of the present application.

FIG. 5 is a flowchart of a backlight compensation method according to a second embodiment of the present application. Prior to S200, the backlight compensation method further includes:

S101: identifying whether the ambient light intensity parameter at the first position and the ambient light intensity parameter at the second position meet a preset condition;

S102: if they meet the preset condition, performing the operation of S200;

S103: if they don't meet a preset condition, directly driving the backlight using a first driving value.

The preset condition may be divided into multiple situations. For example, when one minimum partition unit is set as one partition, the brightness difference between adjacent partitions is still greater than 1.007 or less than 0.993, that is, the ratio of the ambient light intensity parameter at the first position to the ambient light intensity parameter at the second position is greater than $q1^{((n-1)}$, then it may be calculated with n as the maximum value and q1 as the maximum value. Or if the ratio of the ambient light intensity parameter at the first position to the ambient light intensity parameter at the second position is less than $q1^{(n-1)}$, then the calculation is performed with n as the maximum value and q1 as the minimum value of 0.993. This means that the sunlight at this angle causes the light intensity difference on both sides of the display panel to be excessively large, which cannot be solved by the compensation solution of this application.

From another solution, the impact of sunlight of different intensities and multiple angles on the display panel can be intelligently learned, thereby filtering out solutions that cannot be compensated. For example, when the light intensity is 300 nit, the light rays from 45 degrees to 90 degrees all meet the condition. When the light intensity is less than 300 nit, the angle range can be extended to 20 degrees to 90 degrees. But relatively speaking, when the light intensity is greater, the light irradiation angular range is larger, resulting in a greater difference in light intensity between the first position and the second position. Therefore, the angular range needs to be narrowed to a range of 50 degrees to 90 degrees.

In this implementation, if the preset condition is not met, then the backlight is driven with a fixed first driving value, and the backlight is no longer compensated and driven.

In particular, there are set n partition parameters from the first position to the second position, and the preset condition includes: the ratio of the ambient light intensity parameter at the first position multiplied by the first preset parameter to the power of (n−1) to the ambient light intensity parameter at the second position is less than or equal to 1.2 and greater than or equal to 0.8, where one lamp bead is disposed each of the partitions, and the first preset parameter is equal to 1.007 or 0.993, the first driving value is the larger one of the ambient light intensity parameter at the first position or the ambient light intensity parameter at the second position, and n is a natural number greater than 0.

In this embodiment, the maximum number of partitions and the maximum first preset parameter are used as the extreme values. Under the extreme values, the calculated ambient light intensity parameter at the second position is equal to the ambient light intensity parameter at the first position multiplied by the first preset parameter to the power of (n−1). In other words, the ratio of the calculated value of the second position to the actual value of the second position needs to lie in the range between 0.8-1.2. That is, if the deviation between the calculated value of the second position and the actual value of the second position is more than +20% (excluding the endpoint value), then the external light is considered to be cluttered light and not meet the preset condition. As such, the larger of the ambient light intensity parameter at the first position and the ambient light intensity parameter at second position is used as the adjustment value for the entire screen which is fed back to the backlight for adjustment.

In particular, prior to S300, backlight compensation method further includes:

S201: identifying whether the ambient light intensity parameter at the third position and the ambient light intensity parameter at the fourth position meet a preset condition;

S202: if they meet the preset condition, performing the operation of S300;

S203: if they don't meet the preset condition, directly driving the backlight with the first driving value.

The preset condition is identical with that in the above-mentioned case from first position to second position. The difference is that there are three possibilities. When the first and second positions meet the preset condition, and the third and fourth positions do not meet the preset condition, then the larger ambient light intensity parameter at the third position and the fourth position is sued as the first driving value, and no compensation with a curve variation is performed in the second direction, but in the first direction, compensation is still performed according to the variation trend of the first position and the second position. In this solution, in the first direction and the second direction, when one meets the preset condition and the other does not meet the preset condition, it is actually a variation compensation in only one direction. For example, if the first direction is satisfied but the second direction is not, then compensation will be made according to the partitions shown in FIG. 2.

In the third possible situation, neither the first direction nor the second direction satisfies the situation. In this case, the larger ambient light intensity parameter among the first position to the fourth position is used as the first driving value for compensation.

The backlight compensation method in this application mainly takes the MINI-LED display panel as an example. The MIN-LED backlight is relatively easier to achieve partition control. For other types of display panels, the technical solution of the present application is also applicable to the cases where the backlight can realize partition control. It will be appreciated that the backlight compensation method of the present application is not limited to LCD display panels, it is also applicable to OLED display panels.

Figure 6:
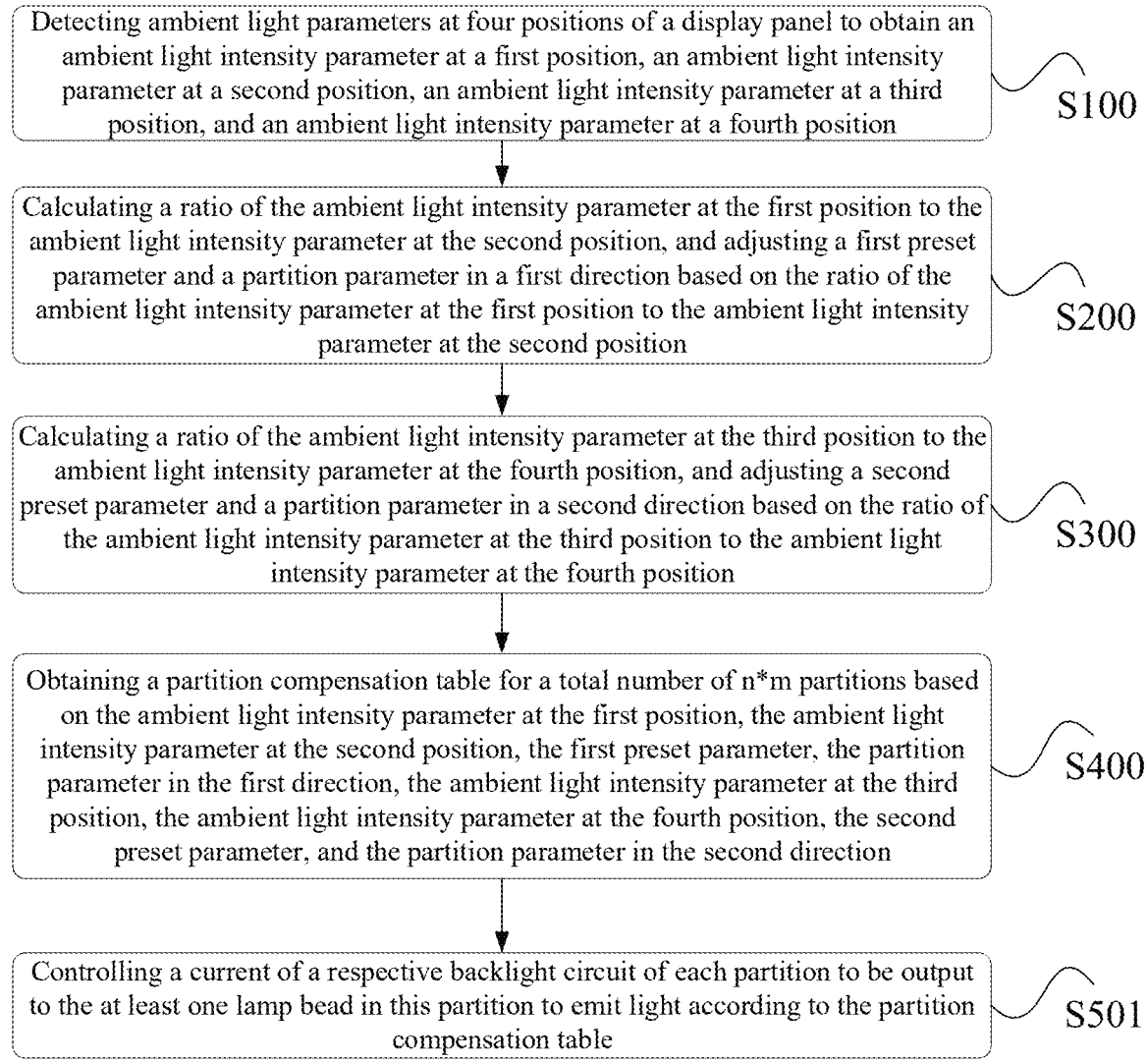
FIG. 6 is a flowchart of a backlight compensation method according to a third embodiment of the present application.

FIG. 6 is a flowchart of a backlight compensation method according to a third embodiment of the present application. Referring to FIG. 6, in step S500, this embodiment provides a first implementation. By adjusting the current of the backlight circuit of each partition, the scheme of adjusting the brightness of the backlight according to the partition compensation table is realized.

In another embodiment, in the step of S500, the backlight compensation method includes:

S501: according to the partition compensation table, controlling the current of the backlight circuit of each partition to be output to the lamp bead of this partition to emit light.

This embodiment is suitable for solutions where each lamp bead can be controlled individually and independently. By controlling the current inputted by the lamp bead(s) in each partition, the method according to the partition compensation table is realized.

In another embodiment, the input current of each lamp bead can still be made different when the lamp bead(s) of each partition cannot be individually and independently controlled.

In particular, it includes adjusting the current amplification factor of the backlight circuit of each partition according to the partition compensation table. The current amplification factor of the backlight circuit of each partition is adjustable. In this embodiment, the circuit amplification factor of the backlight circuit can be adjusted through the program. Different amplification factors may be set for different partitions according to the layout of the partition compensation table. In this embodiment, the amplification factors of different partitions can be adjusted.

The input current is adjusted based on the ambient light intensity parameter at the first position and is then input into the backlight circuit of each partition. Through different current amplification factors in combination with the input initialization current, different current values can be input to different partitions. The input standard value current may also be adjusted based on the ambient light intensity parameter at the second position. The lower of the ambient light intensity parameter in the first position and the ambient light intensity parameter in the second position may be selected to adjust the input standard value current. The standard value current may be input into the backlight circuit set with the preset amplification factor so that the backlight driving current of each partition is different and corresponds to the partition compensation table.

In another embodiment, the resistance or amplification factor of each lamp bead in the backlight circuit can be fixed according to the preset partition compensation table. For example, q1 may be equal to 1.007 or 0.993, and n may be a minimum unit as a partition. A standard partition compensation table is formed, and the resistance or amplification factor required by the backlight circuit of each partition is calculated based on the standard partition compensation table. Thus, the backlight circuit of each partition is adjusted to be fixed. Of course, this solution is currently a relatively low-cost solution. In this solution, the standard partition compensation table is set, but the coefficient K may be set so that the partition compensation table in the actual solution is equal to the standard partition compensation table multiplied by the K value, thereby achieving accurate compensation.

FIG. 7 is a flowchart of a backlight compensation method according to a fourth embodiment of the present application. Referring to FIG. 7, the operation of S500 includes:

S511: generating a standard compensation table according to a standard first preset parameter, a standard second preset parameter and a number of partitions;

S512: fixing the current amplification factor of each partition ac-cording to the standard compensation table to form a backlight circuit compensated based on the standard compensation table;

S513: outputting an initialization current to the backlight circuit ac-cording to the ambient light intensity parameter at the first position or the ambient light intensity parameter at the second position, and the correction coefficient;

where the correction coefficient is obtained based on the standard compensation table and the partition compensation table, and the number of partitions is n*m.

In this solution, a standard partition compensation table is set, and the backlight circuit is designed based on the standard partition compensation table, that is, the amplification factor corresponding to each partition is fixed, and the amplification factor is confirmed based on the standard first preset parameter and the standard partition parameter.

FIG. 8 is a schematic diagram of a partition compensation table according to the fourth embodiment of the present application. On the basis of FIGS. 2 and 3, a1 and b1 are proposed, and the standard first preset value q1 and the standard second preset value q2 are brought in to obtain the partition compensation table, thus realizing the purpose that the partition compensation table is only related to q1, q2 and n and m. According to the partition compensation table, in the above-mentioned embodiments, the solution of using the fixed n and m to calculate q1 and q2, or the solution of using q1 and q2 to calculate n and m, or the solution of the standard partition compensation table, may be used to design the backlight circuit of the backlight source.

In this solution, there is no need to individually control each lamp bead in the backlight circuit. It is only needed to set the amplification factor corresponding to each lamp bead based on the standard partition compensation table in FIG. 8, use a fixed amplification factor method, and then correct the parameter K to compensate for the difference between the actual partition compensation table and the standard partition compensation table. The backlight circuit in this embodiment does not need to individually control each lamp bead. Only by setting different amplification factors, it can be realized that after the same initialization current is input, the lamp beads in different partitions receive different currents, and the currents are correlated with the arrangement of the partition compensation table.

It may be understood that this standard partition compensation table can be machine-learned. After separately learning partition compensation schemes for various types of sunlight at different angles, the optimum partition compensation table may be selected. The compensation solution of this application may be set before shipping. During actual use, the display panel selects a corresponding partition compensation scheme based on the ambient light intensity parameters at the first position and the second position.

Furthermore, in this embodiment, the correction coefficient K can be set. In one embodiment, the partition compensation table in the actual solution is equal to the standard partition compensation table multiplied by the K value, thereby achieving accurate compensation.

Figure 9:
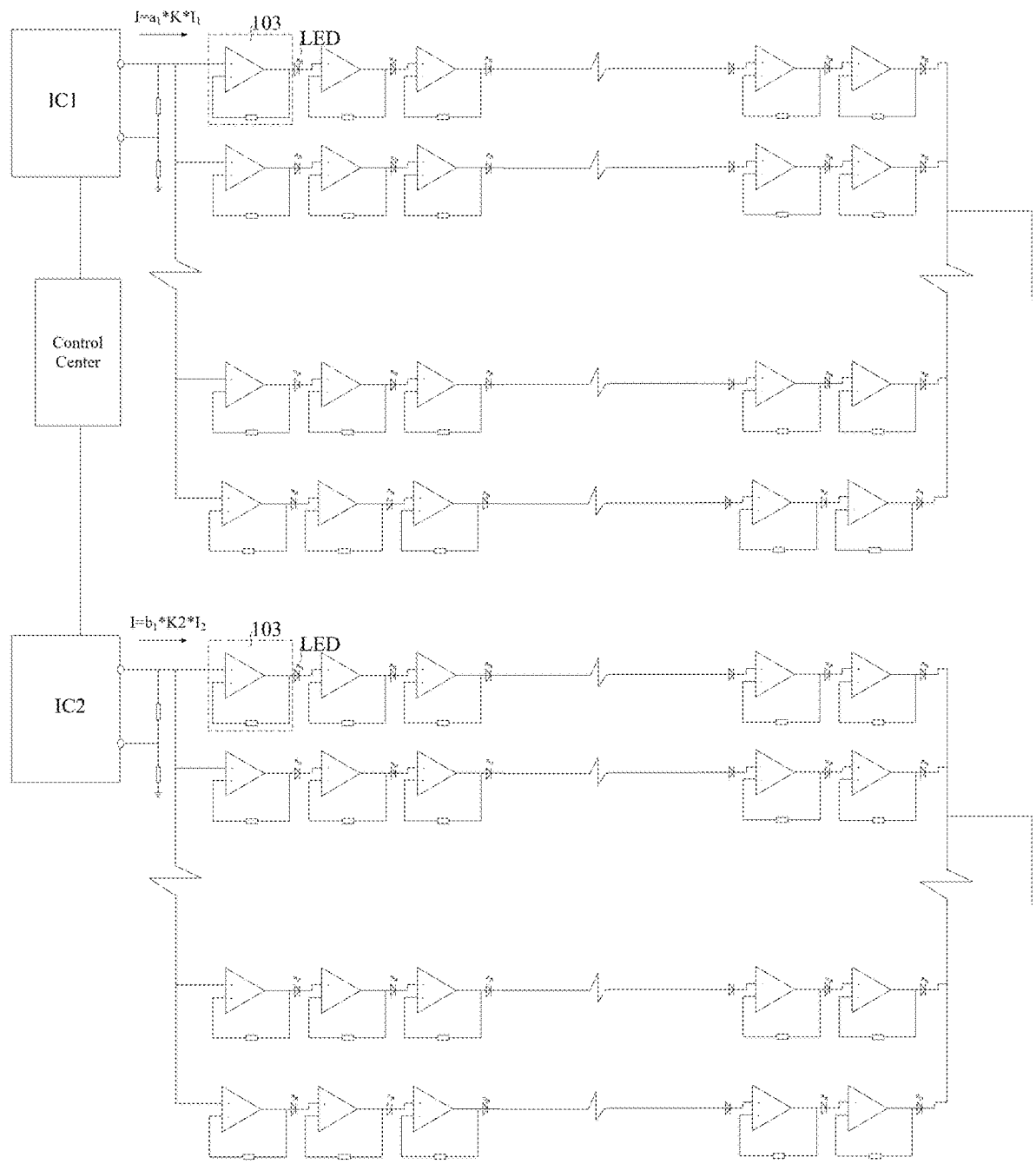
FIG. 9 is a schematic diagram of a first group of backlight circuits and a second group of backlight circuits according to the present application.

FIG. 9 is a schematic diagram of a first group of backlight circuits and a second group of backlight circuits according to this application. As shown in FIG. 9, each set of backlight circuits includes multiple rows of LED lamp beads in an array, where each lamp bead is connected to an amplification unit to form an LED partition. In each row of partitions, a plurality of LED partitions are connected in series, wherein the current amplification factor of the backlight circuit of each partition is consistent with that shown in FIG. 8, and n=m is taken as an example in this solution. In this embodiment, since the first direction and the second direction are in a superimposed relationship, in the backlight circuit, it is designed as a superimposed circuit, where the first group of backlight circuits is designed as the partition variation in the first direction multiplied by the first correction coefficient K1 as shown in FIG. 2, and the second group of backlight circuits is designed as the partition variation in the second direction multiplied by the second correction coefficient K2. Thereby, four possibilities of whether the first direction meets the preset condition and whether the second direction meets the preset condition are realized.

The specific process includes: in the standard partition compensation table, the value in the first direction, that is, $L(x)=a1*q1^{(x-1)}$, is multiplied by the first correction coefficient K1, and the value in the second direction, that is, $L(y)=b1*q2^{(y-1)}$, is multiplied by the second correction coefficient K2. Keeping the values of q1, q2 and n unchanged, the corresponding current values $a1*I1*K1$ and $b1*I2*K2$ may be calculated and then output to the first group of backlight circuits and the second group of backlight circuits respectively, where I1 and I2 are respectively the magnitudes of the currents input to the backlight circuit when the screen is clearly visible under a certain known ambient brightness.

Figure 10:
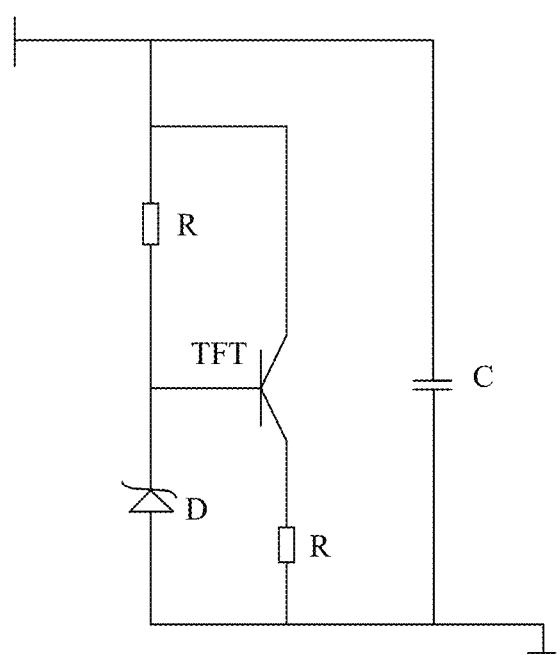
FIG. 10 is a schematic diagram of a current stabilizing circuit according to the present application.

In this embodiment, a current stabilizing circuit is arranged in series corresponding to each amplifying unit for controlling the current in the circuit to be the required current, namely stabilizing the circuit after the amplification factor of the amplifying unit. The current stabilizing circuit is shown in FIG. 10 and consists of two resistors, a capacitor, a thin film transistor and a current stabilizing diode.

In particular, when the ambient light intensity parameter at the first position is equal to the ambient light parameter at the second position, the first preset parameter is 1. When the ambient light intensity parameter at the first position is greater than the ambient light intensity parameter at the second position, the first preset parameter is less than 1. When the ambient light intensity parameter at the first position is smaller than the ambient light intensity parameter at the second position, the first preset parameter is greater than 1.

Figure 11:
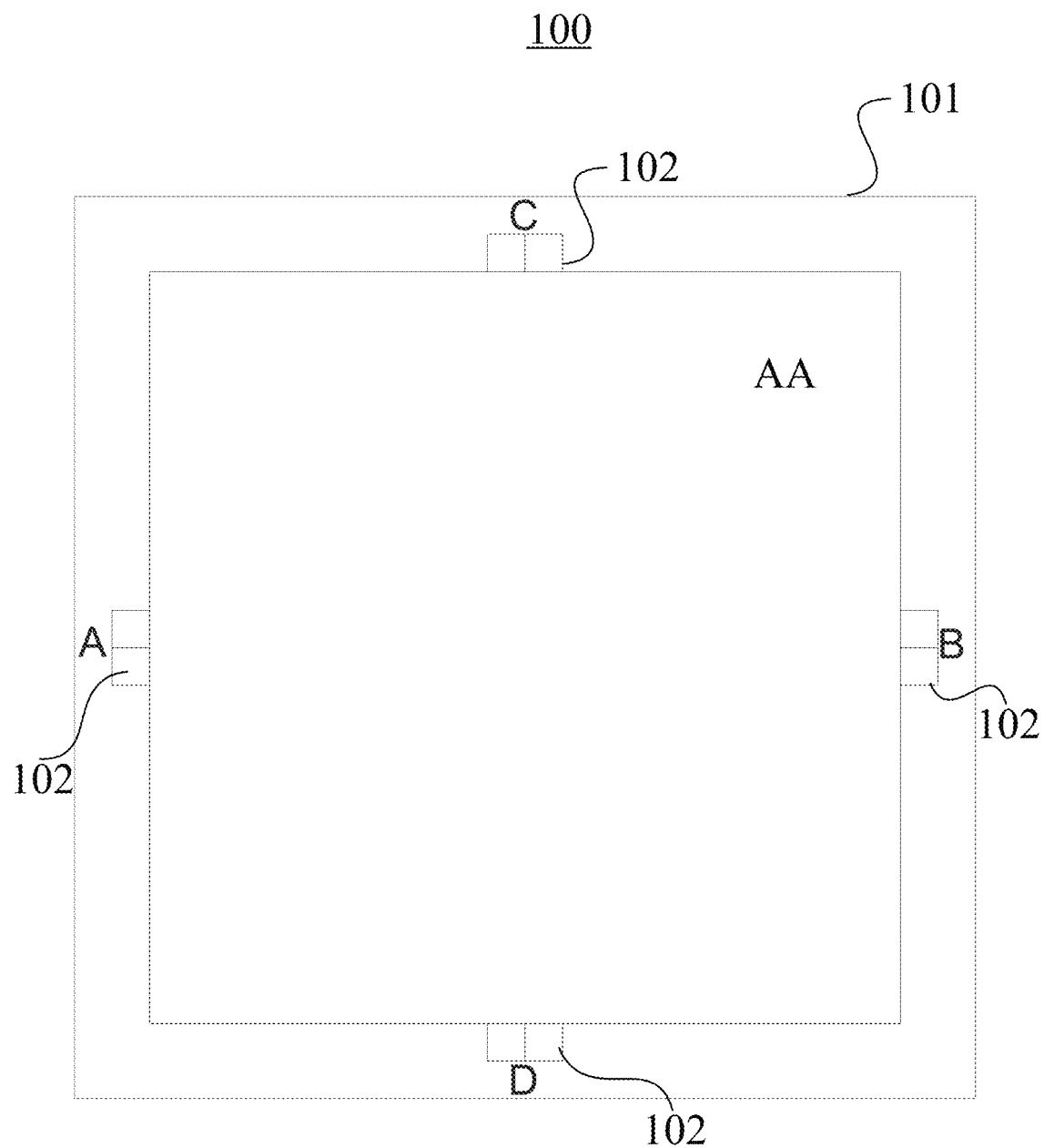
FIG. 11 is a schematic diagram of a display panel according to the present application.
Figure 12:
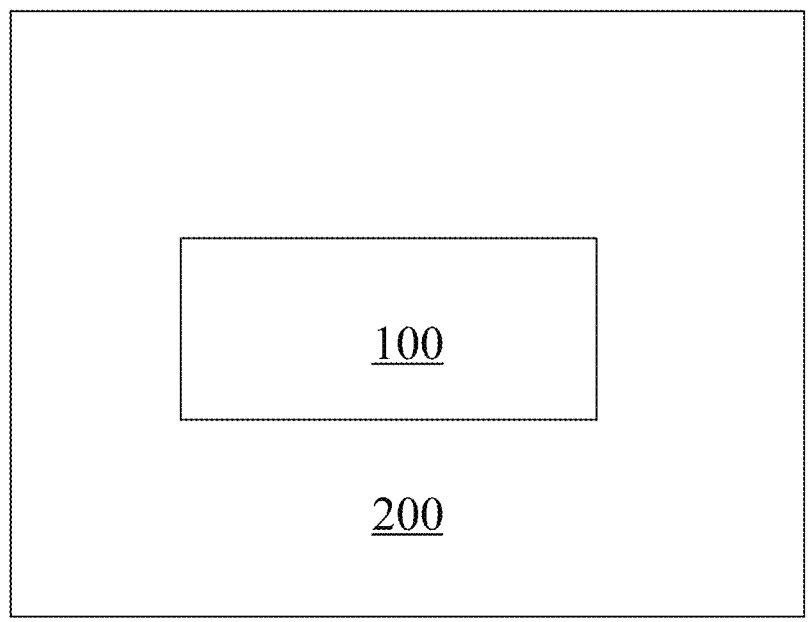
FIG. 12 is a schematic diagram of a display device according to the present application.

FIG. 11 is a schematic diagram of a display panel according to the present application. Referring to FIG. 12, the present application further discloses a display panel 100, including a display substrate 101, a backlight source (not shown) arranged under the display substrate, ambient light sensors 102 arranged on both sides of the light-emitting surface of the display substrate, and a drive control module (not shown). In the figure, A, B, C, and D respectively represent the first position, the second position, the third position and the fourth position, and AA represents the display area. The ambient light sensors 102 are disposed outside the display area. The four ambient light sensors of this application may be disposed at the four positions A, B, C, and D.

The ambient light sensors are used to detect the ambient light parameters of the display panel to obtain the ambient light intensity parameter at the first position and the ambient light intensity parameter at the second position. The drive control module calculates the ratio of the ambient light intensity parameter at the first position to the ambient light intensity parameter at the second position, and adjusts the first preset parameter and the partition parameter based on the ratio of the ambient light intensity parameter at the first position to the ambient light intensity parameter at the second position and the preset model. The partition compensation table for multiple partitions is then obtained based on the ambient light intensity parameter at the first position, the ambient light intensity parameter at the second position, the first preset parameter and the partition parameter. The drive control module controls the backlight source to drive the backlights of different partitions according to the partition compensation table. The display panel in this embodiment can adopt the backlight compensation method of any of the above-mentioned embodiments.

In particular, four ambient light sensors are provided, which are respectively located on the four sides of the light-emitting surface of the display substrate. The ambient light sensors are used to detect the ambient light parameters of the display panel, and obtain the ambient light intensity parameter at the first position, the ambient light intensity parameter at the second position, the ambient light intensity parameter at the third position, and the ambient light intensity parameter at the fourth position. The four positions are respectively the four sides of the light emitting surface of the display panel. The third position and the fourth position are opposite sides. The direction pointing from the first position to the second position is the first direction, and the direction pointing from the third position to the fourth position is the second direction. The drive control module calculates the ratio of the ambient light intensity parameter at the first position to the ambient light intensity parameter at the second position, and adjusts the first preset parameter and the partition parameter in the first direction based on the ratio of the ambient light intensity parameter at the first position to the ambient light intensity parameter at the second position and the preset model. The drive control module further calculates the ratio of the ambient light intensity parameter at the third position to the ambient light intensity parameter at the fourth position, and adjusts the second preset parameter and the partition parameter in the second direction based on the ratio of the ambient light intensity parameter at the third position to the ambient light intensity parameter at the fourth position and the preset model. The number of partitions in the first direction is n, and the number of partitions in the second direction is m. Then the partition compensation table for n*m partitions is obtained based on the ambient light intensity parameter at the first position, the ambient light intensity parameter at the second position, the first preset parameter, the partition parameter in the first direction, the ambient light intensity parameter at the third position, the ambient light intensity parameter at the fourth position, the partition parameter in the second direction. In the partition compensation table, the ambient light intensity parameter of the (x, y) partition is $L(x, y)=a1*q1^{(x-1)}*b1*q2^{(y-1)}$, $1 \le x \le n$, $1 \le y \le m$, where a1 is the ambient light intensity parameter at the first position, q1 is the first preset parameter, b1 is the ambient light intensity parameter at the third position, and q2 is the second preset parameter. The drive control module controls the backlight source to drive the backlights of different partitions according to the partition compensation table.

In this application, the ambient light on the light-emitting surface of the display panel is detected, and based on the ambient light intensity parameters detected at two relative positions (A-B, C-D), the number of partitions, the first preset parameter and the second parameter are determined, where there are formed a number of n*m partitions, and the partition compensation table is obtained. Finally, the backlight parameters of each partition is adjusted according to the partition compensation table so that the brightnesses of different partitions are different and approach the ambient light intensity distribution of the various partitions in the partition compensation table. In this application, by adjusting the light intensities of the backlight according to the distribution of ambient light, even if the intensity of ambient light is different at each position, each position can be displayed very clearly, improving the viewing effect.

In another embodiment, following the above, the four positions ABCD are divided into positions arranged at the four corners of the display panel, where A-C are diagonal corners and B-D are diagonal corners. The ambient light intensity variation in the first direction is obtained from A-B, and the ambient light intensity variation in the second direction is obtained from A-D. Furthermore, C-D is used to verify the ambient light intensity variation in the first direction, and B-C is used to verify the ambient light intensity variation in the second direction.

Referring to FIG. 12, this application further discloses a display device, which includes the above-mentioned display panel 100. The display device includes vehicle-mounted displays and outdoor displays. The solution proposed in this application is mainly suitable for vehicle-mounted displays and outdoor displays. These displays are mainly used outdoors, and their strong light effects mainly come from sunlight, while other light rays have weak interference with sunlight due to their low intensity. Therefore, the ambient light can be directly regarded as parallel and uniform light, with very little influence from disorderly light.

It should be noted that the inventive concept of the present application can be formed into many embodiments, but the length of the application document is limited and so these embodiments cannot be enumerated one by one. The technical features can be arbitrarily combined to form a new embodiment, and the original technical effect may be enhanced after the various embodiments or technical features are combined.

The foregoing is merely a further detailed description of the present application with reference to some illustrative embodiments, and the specific implementations of this application shall not be construed to be limited to these illustrative embodiments. For those having ordinary skill in the technical field to which this application pertains, numerous deductions or substitutions may be made without departing from the concept of this application, which shall all be regarded as falling in the scope of protection of this application.

What is claimed is:

1. A backlight compensation method for a display panel, the display panel comprising a backlight source configured to provide a light source for the display panel, the backlight compensation method comprising:
    detecting ambient light parameters at four positions of the display panel to obtain an ambient light intensity parameter at a first position, an ambient light intensity parameter at a second position, an ambient light intensity parameter at a third position, and an ambient light intensity parameter at a fourth position, wherein the four positions of the display panel comprise the first position, the second position, the third position, and the fourth position;
    calculating a ratio of the ambient light intensity parameter at the first position to the ambient light intensity parameter at the second position, and adjusting a first preset parameter and a partition parameter in a first direction based on the ratio of the ambient light intensity parameter at the first position to the ambient light intensity parameter at the second position and a respective preset model;
    calculating a ratio of the ambient light intensity parameter at the third position to the ambient light intensity parameter at the fourth position, and adjusting a second preset parameter and a partition parameter in a second direction based on the ratio of the ambient light intensity parameter at the third position to the ambient light intensity parameter at the fourth position and a respective preset model;
    obtaining a partition compensation table for a total number of n*m partitions based on the ambient light intensity parameter at the first position, the ambient light intensity parameter at the second position, the first preset parameter, the partition parameter in the first direction, the ambient light intensity parameter at the third position, the ambient light intensity parameter at the fourth position, the second preset parameter, and the partition parameter in the second direction;
    driving backlight sources of a plurality of different partitions according to the partition compensation table;
    wherein the four positions are respectively four sides of a light-emitting surface of the display panel, wherein the first position and the second position are opposite sides, and wherein the third position and the fourth position are opposite sides, wherein a direction pointing from the first position to the second position is the first direction, the direction pointing from the third position to the fourth position is the second direction, wherein a number of partitions arranged in the first direction is n, and a number of partitions arranged in the second direction is m, and wherein a total number of the plurality of different partitions is n*m; wherein the first preset parameter is a ratio of the ambient light intensity parameters between every two adjacent partitions arranged in the first direction, and the second preset parameter is a ratio of the ambient light intensity parameters between every two adjacent partitions arranged in the second direction; wherein each of the plurality of different partitions comprises at least one lamp bead, and wherein m and n are natural numbers greater than 0.

2. The backlight compensation method as recited in claim 1, wherein the first preset parameter is less than or equal to 1.007 and greater than or equal to 0.993.

3. The backlight compensation method as recited in claim 2, wherein when the ambient light intensity parameter at the first position is equal to the ambient light parameter at the second position, the first preset parameter is 1; when the ambient light intensity parameter at the first position is greater than the ambient light intensity parameter at the second position, the first preset parameter is less than 1; and when the ambient light intensity parameter at the first position is less than the ambient light intensity parameter at the second position, the first preset parameter is greater than 1.

4. The backlight compensation method as recited in claim 1, wherein the second preset parameter is less than or equal to 1.007 and greater than or equal to 0.993.

5. The backlight compensation method as recited in claim 1, further comprising the following operations prior to the operations of calculating the ratio of the ambient light intensity parameter at the first position to the ambient light intensity parameter at the second position and adjusting the first preset parameter and the partition parameter in the first direction based on the ratio of the ambient light intensity parameter at the first position to the ambient light intensity parameter at the second position and the preset model:
identifying whether the ambient light intensity parameter at the first position and the ambient light intensity parameter at the second position meet a preset condition;
in response to identifying that the ambient intensity parameter at the first position and the ambient light intensity parameter at the second position meet the preset condition, performing the operations of calculating the ratio of the ambient light intensity parameter at the first position to the ambient light intensity parameter at the second position, and adjusting the first preset parameter and the partition parameter in the first direction based on the ratio of the ambient light intensity parameter at the first position to the ambient light intensity parameter at the second position and the preset model; and
in response to identifying that the ambient intensity parameter at the first position and the ambient light intensity parameter at the second position don't meet the preset condition, directly driving the backlight using a first driving value.

6. The backlight compensation method as recited in claim 5, wherein there are set a number of n partition parameters from the first position to the second position, and the preset condition comprises: the ratio of the ambient light intensity parameter at the first position multiplied by the first preset parameter to the power of (n−1) to the ambient light intensity parameter at the second position is less than or equal to 1.2 and greater than or equal to 0.8;
wherein one lamp bead is disposed in each of the plurality of partitions, and wherein the first preset parameter is equal to 1.007 or 0.993;
wherein the first driving value is the larger of the ambient light intensity parameter at the first position or the ambient light intensity parameter at the second position.

7. The backlight compensation method as recited in claim 1, further comprising the following operations prior to the operations of calculating the ratio of the ambient light intensity parameter at the third position to the ambient light intensity parameter at the fourth position and adjusting the second preset parameter and the partition parameter in the second direction based on the ratio of the ambient light intensity parameter at the third position to the ambient light intensity parameter at the fourth position and the preset model:
identifying whether the ambient light intensity parameter at the third position and the ambient light intensity parameter at the fourth position meet a preset condition;
in response to identifying that the ambient intensity parameter at the third position and the ambient intensity parameter at the fourth position meet the preset condition, performing the operations of calculating the ratio of the ambient light intensity parameter at the third position to the ambient light intensity parameter at the fourth position, and adjusting the second preset parameter and the partition parameter in the second direction based on the ratio of the ambient light intensity parameter at the third position to the ambient light intensity parameter at the fourth position and the preset model; and
in response to identifying that the ambient intensity parameter at the third position and the ambient intensity parameter at the fourth position don't meet the preset condition, directly driving the backlight using a first driving value.

8. The backlight compensation method as recited in claim 1, wherein there are disposed a number of n partitions from the first position to the second position, wherein the corresponding preset model is that the ratio of the ambient light intensity parameter at the first position to the ambient light intensity parameter at the second position is equal to the first preset parameter to the power of (n−1); wherein there are disposed a number of m partitions from the third position to the fourth position, and the corresponding preset model is that the ratio of the ambient light intensity parameter at the third position to the ambient light intensity parameter at the fourth position is equal to the second preset parameter to the power of (m−1); wherein in the partition compensation table, the ambient light intensity parameter $L(x, y)$ of the $(x, y)$-th partition satisfies $L(x, y)=a1*q1^{(x-1)}+b1*q2^{(y-1)}$, $1 \leq x \leq n$, $1 \leq y \leq m$; wherein a1 is the ambient light intensity parameter at the first position, q1 is the first preset parameter, b1 is the ambient light intensity parameter at the third position, q2 is the second preset parameter, and x and y are natural numbers greater than 0.

9. The backlight compensation method as recited in claim 1, wherein the operation of driving the backlight sources of the plurality of different partitions according to the partition compensation table comprises:
controlling a current of a backlight circuit of each of the plurality of partitions to be output to the at least one lamp bead in this partition to emit light according to the partition compensation table.

10. The backlight compensation method as recited in claim 9, wherein a current amplification factor of the backlight circuit of each of the plurality of partitions is adjustable.

11. The backlight compensation method as recited in claim 1, wherein the operation of driving the backlight sources of the plurality of different partitions according to the partition compensation table comprises:
generating a standard compensation table based on a standard first preset parameter, a standard second preset parameter, and the total number of partitions;
fixing the current amplification factor of each of the plurality of partitions based on the standard compensation table to obtain a respective backlight circuit compensated based on the standard compensation table;
outputting an initialization current to the backlight circuit based on the ambient light intensity parameter at the first position or the ambient light intensity parameter at the second position, and a correction coefficient;
wherein the correction coefficient is obtained based on the standard compensation table and the partition compensation table.

12. The backlight compensation method as recited in claim 11, wherein the partition compensation table is equal to the standard partition compensation table multiplied by a K value, the K value being a correction coefficient.

13. A display panel, comprising a display substrate, a backlight source disposed under the display substrate, four ambient light sensors respectively arranged on four sides of a light-emitting surface of the display substrate, and a drive control module;
wherein the four ambient light sensors are used to detect ambient light parameters at four positions of the display panel to obtain an ambient light intensity parameter at a first position, an ambient light intensity parameter at a second position, an ambient light intensity parameter at a third position, and an ambient light intensity parameter at a fourth position, wherein the four positions of the display panel comprise the first position, the second position, the third position, and the fourth position;
wherein the four positions are respectively the four sides of a light-emitting surface of the display panel;
wherein the third position and the fourth position are opposite sides, wherein a direction pointing from the first position to the second position is a first direction, and wherein a direction pointing from the third position to the fourth position is a second direction;
wherein the drive control module is configured to calculate a ratio of the ambient light intensity parameter at the first position to the ambient light intensity parameter at the second position, and adjust a first preset parameter and a partition parameter in the first direction based on the ratio of the ambient light intensity parameter at the first position to the ambient light intensity parameter at the second position and a respective preset model;

wherein the drive control module is further configured to:
calculate a ratio of the ambient light intensity parameter at the third position to the ambient light intensity parameter at the fourth position, and adjust a second preset parameter and a partition parameter in the second direction based on the ratio of the ambient light intensity parameter at the third position to the ambient light intensity parameter at the fourth position and a respective preset model; and obtain a partition compensation table for a total number of n*m partitions based on the ambient light intensity parameter at the first position, the ambient light intensity parameter at the second position, the first preset parameter, the partition parameter in the first direction, the ambient light intensity parameter at the third position, the ambient light intensity parameter at the fourth position, the second preset parameter, and the partition parameter in the second direction;
wherein a number of partitions arranged in the first direction is n, a number of partitions arranged in the second direction is m, and wherein m and n are natural numbers greater than 0;
wherein the drive control module is further configured to control the backlight source to drive backlights of a plurality of different partitions according to the partition compensation table.

14. The display panel as recited in claim 13, wherein each of the plurality of partitions comprises at least one lamp bead.

15. The display panel as recited in claim 13, wherein in the partition compensation table, an ambient light intensity parameter $L(x, y)$ of the $(x, y)$-th partition satisfies $L(x, y)=a1*q1^{(x-1)}+b1*q2^{(y-1)}$, $1 \le x \le n$, $1 \le y \le m$; wherein a1 is the ambient light intensity parameter at the first position, q1 is the first preset parameter, b1 is the ambient light intensity parameter at the third position, q2 is the second preset parameter, and x and y are natural numbers greater than 0.

16. The display panel as recited in claim 15, wherein the first preset parameter is less than or equal to 1.007 and greater than or equal to 0.993.

17. The display panel as recited in claim 16, wherein when the ambient light intensity parameter at the first position is equal to the ambient light parameter at the second position, the first preset parameter is 1; when the ambient light intensity parameter at the first position is greater than the ambient light intensity parameter at the second position, the first preset parameter is less than 1; when the ambient light intensity parameter at the first position is less than the ambient light intensity parameter at the second position, the first preset parameter is greater than 1.

18. The display panel as recited in claim 15, wherein the second preset parameter is less than or equal to 1.007 and greater than or equal to 0.993.

19. The display panel as recited in claim 13, wherein only one lamp bead is disposed in each of the plurality of partitions.

* * * * *